(12) United States Patent
Chaplin

(10) Patent No.: US 7,669,230 B2
(45) Date of Patent: Feb. 23, 2010

(54) SECURE SWITCHING SYSTEM FOR NETWORKS AND METHOD FOR SECURING SWITCHING

(75) Inventor: Clint Chaplin, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 664 days.

(21) Appl. No.: 11/095,065

(22) Filed: Mar. 30, 2005

(65) Prior Publication Data

US 2006/0229061 A1    Oct. 12, 2006

(51) Int. Cl.
*G06F 7/04* (2006.01)
*H04L 29/06* (2006.01)
*H04L 9/32* (2006.01)
*H04L 9/08* (2006.01)
*H04W 36/00* (2009.01)

(52) U.S. Cl. .................. 726/2; 713/150; 713/171; 380/278; 455/436

(58) Field of Classification Search ......... 380/255–257, 380/259–262, 270–273, 277–279; 713/150, 713/171; 726/2; 455/411, 436–442
See application file for complete search history.

(56) References Cited

U.S. PATENT DOCUMENTS

| | | | |
|---|---|---|---|
| 6,295,361 B1 * | 9/2001 | Kadansky et al. | 380/278 |
| 6,370,380 B1 * | 4/2002 | Norefors et al. | 455/436 |
| 6,418,130 B1 * | 7/2002 | Cheng et al. | 370/331 |
| 6,587,680 B1 * | 7/2003 | Ala-Laurila et al. | 455/411 |
| 2002/0076054 A1 * | 6/2002 | Fukutomi et al. | 380/277 |

(Continued)

FOREIGN PATENT DOCUMENTS

EP    1 418 711 A3    5/2004

(Continued)

OTHER PUBLICATIONS

Blumenthal et al., "A Scheme for Authentication and dynamic Key Exchange in Wireless Networks," Bell Labs Technical Journal, Lucent Technologies Inc, 2002, 7(2), pp. 37-48.*

(Continued)

*Primary Examiner*—Kimyen Vu
*Assistant Examiner*—Darren Schwartz

(57) ABSTRACT

Methods and systems are provided for secure switching of a roaming wireless terminal. The system includes a network having a plurality of access points for communicating with a wireless terminal. The network includes a first access point configured to couple with the wireless terminal, and a second access point configured to couple with the wireless terminal. The first access point is further configured to generate a first authentication information with the wireless terminal, and connect the wireless terminal with the network upon an authentication of the wireless terminal based on the first authentication information. The first access point is further configured to transmit the first authentication information to the second access point via the network upon the authentication of the wireless terminal. The second access point is further configured to connect the wireless terminal with the network using the first authentication information. The method includes the steps of generating a first authentication information during authentication of the wireless client with a first access point, broadcasting the first authentication information from the first access point to other access points of the network via the network, and connecting the wireless client with the network at a second access point using the first authentication information.

3 Claims, 2 Drawing Sheets

U.S. PATENT DOCUMENTS

| | | | |
|---|---|---|---|
| 2002/0085719 A1* | 7/2002 | Crosbie | 380/248 |
| 2002/0197979 A1* | 12/2002 | Vanderveen | 455/410 |
| 2003/0166397 A1* | 9/2003 | Aura | 455/410 |
| 2004/0039910 A1* | 2/2004 | Isokangas et al. | 713/171 |
| 2004/0077335 A1* | 4/2004 | Lee et al. | 455/410 |
| 2004/0166857 A1* | 8/2004 | Shim et al. | 455/436 |
| 2004/0203781 A1* | 10/2004 | Lefkowitz | 455/436 |
| 2004/0203783 A1* | 10/2004 | Wu et al. | 455/436 |
| 2004/0236939 A1* | 11/2004 | Watanabe et al. | 713/150 |
| 2004/0240411 A1* | 12/2004 | Suzuki | 370/331 |
| 2005/0141457 A1* | 6/2005 | Lee et al. | 370/331 |
| 2006/0121883 A1* | 6/2006 | Faccin | 455/411 |

FOREIGN PATENT DOCUMENTS

| | | |
|---|---|---|
| WO | WO 2004/027637 | 1/2004 |
| WO | WO 2005/027560 | 3/2005 |

OTHER PUBLICATIONS

U.S. Appl. No. 60/600,617.*
International Search Report for PCT/US2006/011657.
Written Opinion of the ISA for PCT/US2006/011657.
Pack, S. et al.; Pre-Authenticated Fast Handoff in a Public Wireless LAN Based on IEEE 802.1x Model; (Journal name not available); 2002, XP002294124.

* cited by examiner

SECURE SWITCHING SYSTEM FOR NETWORKS AND METHOD FOR SECURING SWITCHING

FIELD OF THE INVENTION

The present invention generally relates to communications in a network environment, and more particularly relates to switching between access points in a network.

BACKGROUND OF THE INVENTION

As a client, or terminal, roams from one access point of a network to another access point, the client may encounter a drop in connectivity or a gap in communication. When switching to a new access point, the client performs a variety of house-keeping or handshaking operations before establishing a connection with the network at the new access point. In general, wireless networks have seen an increasing demand for Quality Of Service (QOS) and security features that both contribute to the house-keeping or handshaking operations. Clients may consequently expend a significant amount of time to establish a proper environment with an access point to permit the connection with the wireless network.

When a client connects with an access point in a wireless network, the client undergoes an authentication process with the access point and/or network prior to connection, and this authentication process typically consumes a significant amount of time. During authentication, the client typically communicates with an authentication server, that may be a part of the access point or may be separate from the access point, and the client mutually authenticates with the authentication server. At the successful completion of a mutual authentication, the authentication server notifies the access point of a successfully completed authentication and transfers enough of the authentication information to the access point to allow secure communication between the client and the access point (e.g., the client can decrypt encrypted communication from the access point and the access point can decrypt encrypted communication from the client). Although the client is allowed to communicate with the authentication server during authentication, the access point denies all other communication between the client and the network, and when switching from one access point to a new access point of the network, the client may experience gaps or delays in communication with the new access point as a result of the authentication process. Each time a client roams to a new access point, the new access point treats the client as a new arrival, and any on-going applications between the client and the network typically experience interruptions from the delays related to the authentication process of a new arrival.

Accordingly, it is desirable to provide a network system having reduced authentication delays when a terminal roams from one access point to another access point in the network system. In addition, it is desirable to provide a secure access point for a wireless network having reduced authentication delays with secure switching between access points for an authorized client. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A system is provided for secure communication between one or more access points and a wireless terminal while reducing authentication delays. The system comprises a first access point configured to couple with the wireless terminal and a second access point networked with the first access point and configured to couple with the wireless terminal. The first access point is further configured to generate a first authentication information with the wireless terminal, and connect the wireless terminal with the system upon authentication of the wireless terminal based at least in part on the first authentication information. The second access point is further configured to receive the first authentication information from the first access point upon the authentication of the wireless terminal and connect the wireless terminal with the system using said first authentication information.

A system is also provided for establishing communication between a wireless client and a network having a plurality of access ports, the system comprising a first access port of the plurality of access ports and a second access port of the plurality of access ports networked with the first access port. The first access port includes means for coupling the first access port with the wireless client, means for generating a first authentication information with the wireless client, means for connecting the wireless client with the network upon authentication of the wireless client based on the first authentication information, and means for transmitting the first authentication information to the plurality of access ports via the network upon the authentication of the wireless client. The second access port includes means for coupling the second access port with the wireless client after coupling the wireless client with the first access port, and means for connecting the wireless client with the network using the first authentication information.

A method is provided for switching a wireless client between access points of a network, the method comprising the steps of generating a first authentication information during authentication of the wireless client with a first access point, broadcasting the first authentication information from the first access point to other access points of the network via the network, and connecting the wireless client with the network at a second access point using the first authentication information.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
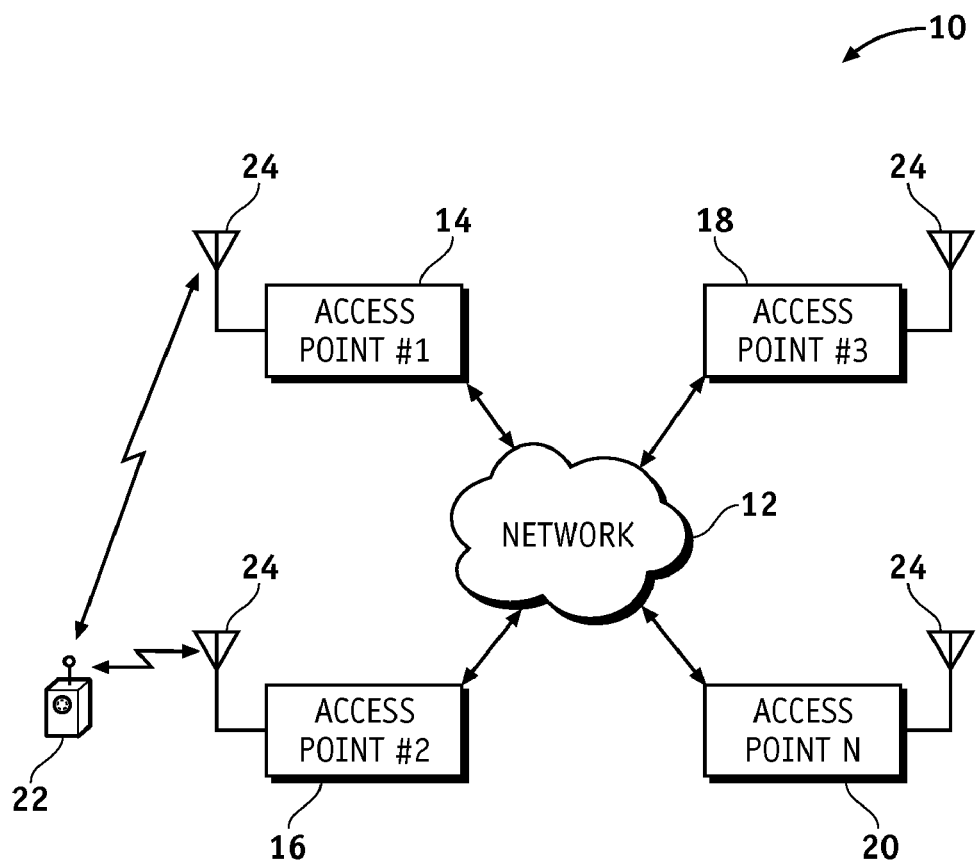
FIG. 1 is a schematic diagram of a wired or wireless network with multiple access points for coupling with a wireless client in accordance with an exemplary embodiment of the present invention.

FIG. 1 is a schematic diagram of a system 10 having a network 12 with multiple access points 14, 16, 18, 20 for coupling with a wireless client 22 in accordance with an exemplary embodiment. The term "access point" is referred to herein as any hardware device or computer software providing a communication hub for connection of a wireless device (e.g., the wireless client 22) to the network 12, such as referred to in The Institute of Electrical and Electronics Engineers (IEEE) 802.11 standard. The system 10 includes, but is not limited to, a first access point 14, a second access point 16, a third access point 18, . . . , and an Nth access point 20 networked with the wireless client 22. The network 12 may be configured to have a wired backbone that interconnects the access points 14, 16, 18, 20, and the system 10 may include any number of such access points.

In an exemplary embodiment, the wireless client 22 includes a radio Network Interface Card (NIC), or similar radio communication processing device, for communication with one or more of the access points 14, 16, 18, 20. In addition, the wireless client 22 may roam from one access point to another access point of the network 12. For example, the wireless client 22 may roam from the first access point 14 to the second access point 16.

In one exemplary embodiment, each of the access points 14, 16, 18, 20 includes an antenna 24 for transmitting and receiving communication signals to and from the wireless client 22 and has a local memory (e.g., RAM, ROM, flash memory, and the like) associated therewith. A successful connection of the wireless client 22 with a particular access point permits communication between the wireless client 22 and the network 12. An example of the network 12 is a Wireless Local Area Network (WLAN), such as IEEE 802.11 standard WLAN.

For convenience of explanation, the system 10 is described with regard to roaming from the first access point 14 to the second access point 16. However, the network 12 may have any number of access points networked with the other access points, and the wireless client 22 may roam to any number of access points. Additionally, although the system 10 is described with regard to a single wireless client 22, the system 10 supports multiple wireless clients.

In addition to the access points 14, 16, 18, 20, the network 12 includes a variety of conventional components such as servers, routers, and the like. Each access point 14, 16, 18, 20 includes a processing unit that performs "handshaking" and/or "house-keeping" operations in preparation for communication between the access point 14, 16, 18, 20 and the wireless client 22. The term "handshaking" is used herein to refer to preliminary procedures prior to establishing communication between two components of the network, such as a Request To Send/Clear To Send (RTS/CTS) function. The term "house-keeping" is used herein to refer to routine procedures for maintaining network integrity. For example, when the wireless client 22 attempts to connect with the network 12 at the first access point 14, the processing unit of the first access point 14 exchanges data frames (e.g., management frames such as RTS frame and CTS frame) with the wireless client 22 to establish and maintain communication.

In an exemplary embodiment of the present invention, the wireless client 22 and the first access point 14 undergo an authentication process (e.g., mutual authentication) during handshaking operations. In general, the wireless client 22 exchanges information with the first access point 14 during authentication, and the wireless client 22 and the first access point 14 each independently generates encryption key information or cryptographic binding information (e.g., pairwise master key encryption) based on this exchanged information. The encryption key information generated by the wireless client 22 may be stored on the radio NIC, and the encryption key information generated by the first access point 14 may be stored in a local memory associated with the first access point 14. A variety of different user-level authentications may be used including, by way of example and not of limitation, an Extensible Authentication Protocol-Transport Level Security (EAP-TLS) authentication, and Protected Extensible Authentication Protocol (PEAP) authentication.

After a successful authentication, the wireless client 22 may communicate with the network 12 through the first access point 14. For example, the wireless client 22 successfully communicates with the network 12 at the first access point 14 if the wireless client 22 and the first access point 14 can each decrypt communications from the other. Upon a successful authentication, the first access point 14 broadcasts the encryption key information generated by the first access point 14 to other access points 16, 18, 20 of the network 12. The wireless client 22 may roam to a different access point, for example the second access point 16, for a variety of purposes, such as to connect to an access point within a closer range. After a first predetermined time period or an expiration period, following receipt of the encryption information from the first access point 14, the access points 16, 18, 20 discard this encryption information. Thus, the wireless client 22 may roam to other access points, within the expiration period, without performing conventional authentication operations.

When the wireless client 22 roams to the second access point 16 within the expiration period, the wireless client 22 encrypts data using the encryption key information generated during communication with the first access point 14 and transmits this encrypted data to the second access point 16. The second access point 16 uses the encryption key information, received from the first access point 14, to decrypt the encrypted data from the wireless client 22. If this decryption is successful, the second access point 16 establishes communication between the wireless client 22 and the network 12. For example, the wireless client 22 successfully communicates with the network 12 at the second access point 16 if the wireless client 22 and the second access point 16 can each decrypt communications from the other.

The second access point 16 re-authenticates the wireless client 22 before a second predetermined time period has elapsed, and during this re-authentication, communication continues between the wireless client 22 and the network 12 at the second access point 16. During re-authentication, the second access point 16 generates encryption key information for decrypting the encrypted data from the wireless client 22, and the second access point 16 broadcasts this encryption key information to other access points 14, 18, 20 of the network 12 upon a successful re-authentication. When the first access point 14 and other non-participating access points 18, 20 receive encryption information from the second access point 16, these access points 14, 18, 20 replace any other encryption information received from the second access point 16 with the currently received encryption information.

In another exemplary embodiment, each access point 12, 14, 18, or 20 periodically transmits encryption information for all of the clients associated with the particular access point at a given transmission event. When a particular client is timed-out from an access point, the corresponding encryption keys are removed from the transmitted information thus notifying the other access points that the client has timed out. Additionally, if the other access points do not timely receive information from the first access point 12, the other access points may determine that the first access point 12 has been corrupted or compromised and take appropriate action.

Figure 2:
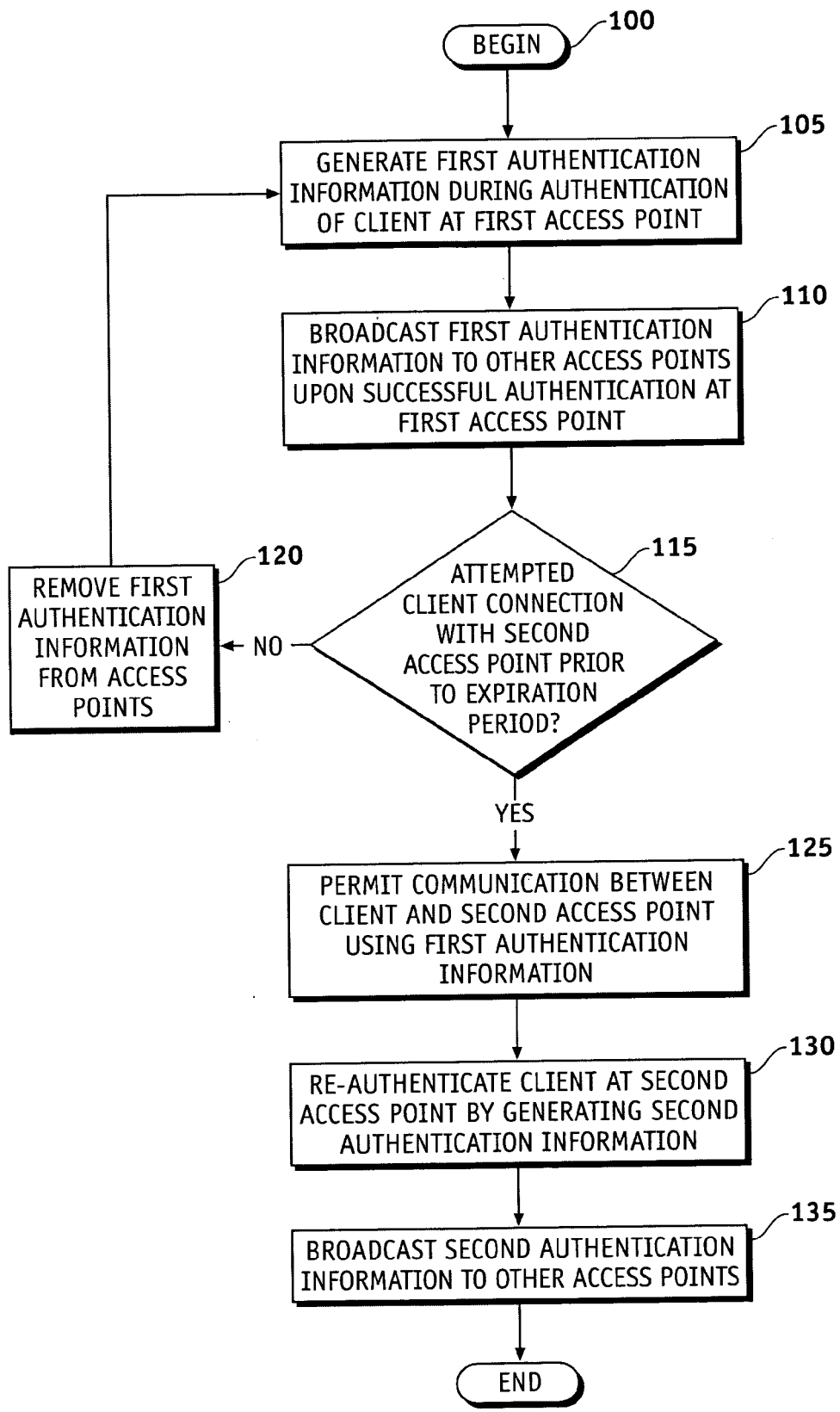
FIG. 2 is a flow diagram illustrating secure switching of a wireless client between access points of a network in accordance with another exemplary embodiment of the present invention.

FIG. 2 is a flow diagram illustrating a secure switching of a wireless client, such as the wireless client 22 shown in FIG. 1, between access points of a network, such as the access points 14, 16, 18, 20 in the network 12 shown in FIG. 1, in accordance with an exemplary embodiment. The method begins at step 100. The first access point generates authentication information or cryptographic binding information during authentication of the wireless client at the first access point at step 105. Upon a successful authentication of the wireless client at the first access point, the first access point broadcasts the authentication information to the other access points in the network at step 110. When the wireless client roams to another access point, such as the second access point, the second access point determines whether the wireless client is attempting to connect with the network at the second access point prior to the expiration period of the authentication information received from the first access point at step 115. If the wireless client attempts to connect with the network at the second access point after this expiration period, the second access point, as well as the non-participating access points in the network, discards the authentication information received from the first access point at step 120. If the wireless client attempts to connect with the network at the second access point prior to this expiration period, the second access point permits communication between the wireless client and the network at step 125. The second access point communicates with the wireless client using the authentication information received from the first access point. Before a predetermined time period, the second access point re-authenticates the wireless client and generates authentication information during this re-authentication at step 130. After the second access point successfully re-authenticates the wireless client, the second access point broadcasts the authentication information generated itself to the other access points of the network at step 135.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for switching a wireless client between a plurality of access points in a network, the method comprising:

performing an authentication procedure with the wireless client and a first access point in the network;

the first access point generating encryption key information during the authentication procedure;

broadcasting the encryption key information from the first access point to a plurality of other access points in the network, including a second access point;

the wireless client contacting the second access point within a predetermined time period after the broadcasting step;

encrypting data with the wireless client, using the encryption key information, to obtain encrypted data;

communicating the encrypted data between the wireless client and the second access point;

decrypting the encrypted data with the second access point, using the encryption key information received from the first access point;

after decrypting the encrypted data with the second access point, performing a re-authentication procedure with the wireless client and the second access point;

the second access point generating second encryption key information during the re-authentication procedure; and broadcasting the second encryption key information from the second access point to a plurality of other access points in the network.

2. The method of claim 1, further comprising:

encrypting data with the wireless client, using the second encryption key information, to obtain additional encrypted data;

communicating the additional encrypted data between the wireless client and the second access point; and decrypting the additional encrypted data with the second access point, using the second encryption key information received from the first access point.

3. The method of claim 1, further comprising:

deleting the encryption key information from the second access point after the second access point generates the second encryption key information.

* * * * *